United States Patent
Adomeit

[19]

[11] Patent Number: 5,826,901
[45] Date of Patent: Oct. 27, 1998

[54] AIRBAG SYSTEM FOR VEHICLE

[75] Inventor: Heinz-Dieter Adomeit, Berlin, Germany

[73] Assignee: Petri AG, Aschaffenburg, Germany

[21] Appl. No.: 869,402

[22] Filed: Jun. 5, 1997

Related U.S. Application Data

[63] Continuation of Ser. No. 516,845, Aug. 18, 1995, abandoned.

[30] Foreign Application Priority Data

Aug. 19, 1994 [DE] Germany .......................... 44 30 588.5

[51] Int. Cl.⁶ .................................................. B60R 21/16
[52] U.S. Cl. ................................. 280/728.2; 280/72.18; 280/731; 280/750
[58] Field of Search ................................. 280/731, 732, 280/728.2, 728.1, 730.1, 750

[56] References Cited

U.S. PATENT DOCUMENTS

| | | | |
|---|---|---|---|
| 3,887,215 | 6/1975 | Albrecht et al. | 280/730.1 |
| 4,200,309 | 4/1980 | Korn et al. | 280/750 |
| 4,334,699 | 6/1982 | Patzelt et al. | 280/731 |
| 4,989,895 | 2/1991 | Pearson et al. | 280/731 |
| 5,005,860 | 4/1991 | Mori et al. | 280/731 |
| 5,209,510 | 5/1993 | Mamiya | 280/732 |
| 5,234,229 | 8/1993 | Gordon | 280/736 |
| 5,267,486 | 12/1993 | Niwa et al. | 280/750 |
| 5,295,712 | 3/1994 | Omura | 280/777 |
| 5,333,897 | 8/1994 | Landis et al. | 280/728 |
| 5,383,682 | 1/1995 | Nagata et al. | 280/777 |

FOREIGN PATENT DOCUMENTS

| | | |
|---|---|---|
| 0199024 | 10/1986 | European Pat. Off. . |
| 0357225 | 3/1990 | European Pat. Off. . |
| 0582107A1 | 2/1994 | European Pat. Off. . |
| 3621226C1 | of 0000 | Germany . |
| 3527581A1 | 2/1987 | Germany . |
| 3711073A1 | 10/1988 | Germany . |
| 92054854 U | 9/1992 | Germany . |
| 211674 | 10/1993 | Germany . |
| 225671 | 2/1994 | Germany . |
| 227559 | 2/1994 | Germany . |
| 1-247241 | 10/1989 | Japan .................................. 280/728.2 |
| 4-135944 | 5/1992 | Japan .................................. 280/728.1 |
| 4135944 | 5/1992 | Japan . |
| 4-166458 | 6/1992 | Japan .................................. 280/728.2 |
| 4166458 | 6/1992 | Japan . |
| 4-303050 | 10/1992 | Japan .................................. 280/728.2 |
| 4-303051 | 10/1992 | Japan .................................. 280/728.2 |
| 5016749 | 1/1993 | Japan . |
| 5024542 | 2/1993 | Japan . |
| 6001196 | 1/1994 | Japan . |
| 6032196 | 2/1994 | Japan . |
| 6293245 | 10/1994 | Japan . |
| 4771650 | of 0000 | United Kingdom . |
| 1367954 | 9/1974 | United Kingdom . |
| 1588919 | 4/1981 | United Kingdom . |
| 2270883 | 3/1994 | United Kingdom . |
| WO9009297 | 8/1990 | WIPO . |

Primary Examiner—Eric D. Culbreth
Attorney, Agent, or Firm—Christie, Parker & Hale, LLP

[57] ABSTRACT

The invention relates to an airbag system for motor vehicles with an airbag and at least one associated gas generator for inflating the airbag in the event of an accident involving the vehicle. According to the invention, the airbag system is fixed on the vehicle where it can be moved at least in part away from the vehicle occupant. To this end, the airbag system is attached to the vehicle so that it can be translated, rotated, or tilted. Preferably it can be moved by the gases emerging from the gas generator after ignition thereof and is fixed on at least one plastically deformable element or spring element. The system according to the invention reduces the risk of injury to the occupant where at the time of inflation of the airbag the vehicle occupant is bending forward in the vehicle seat.

10 Claims, 19 Drawing Sheets

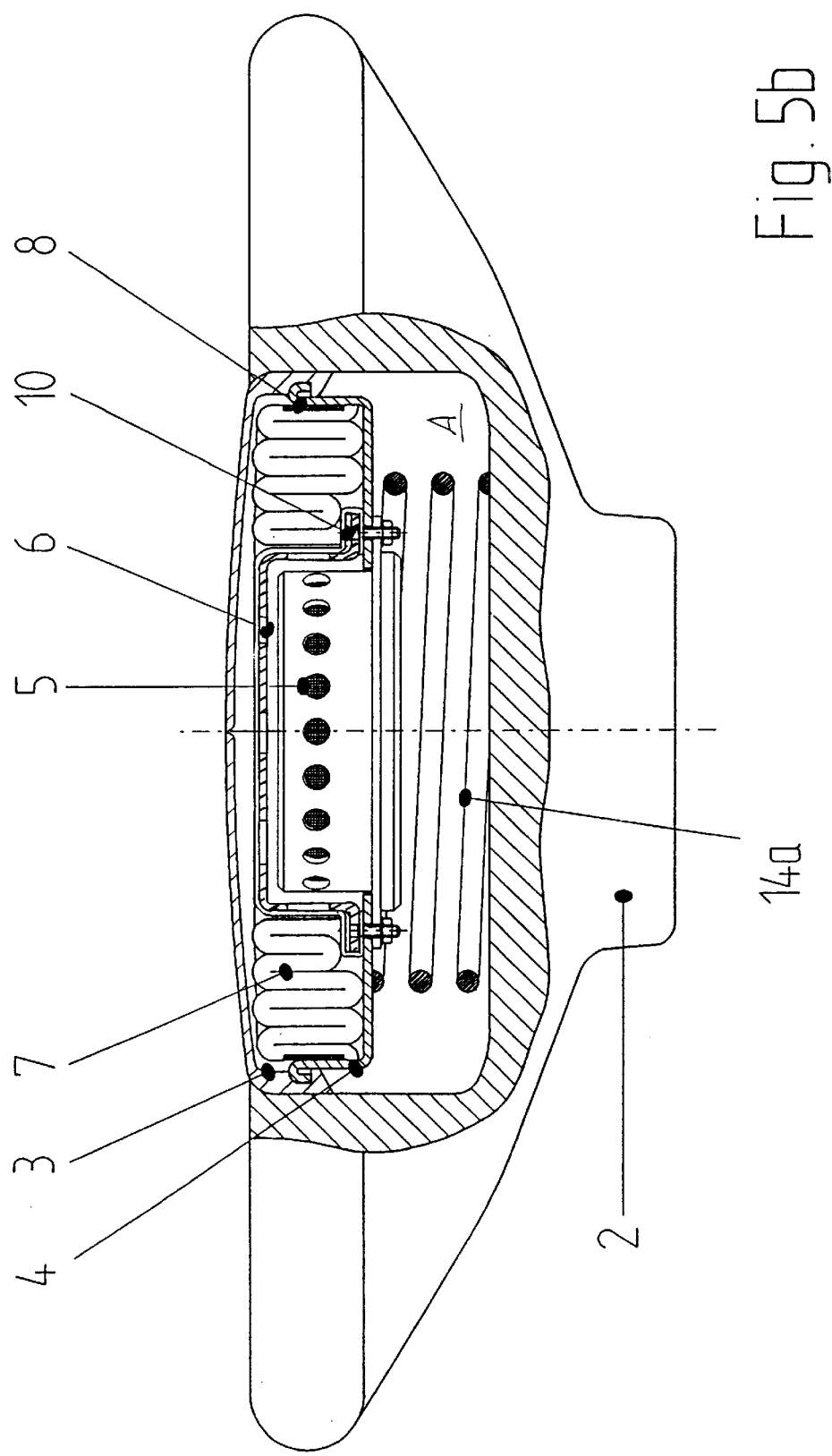

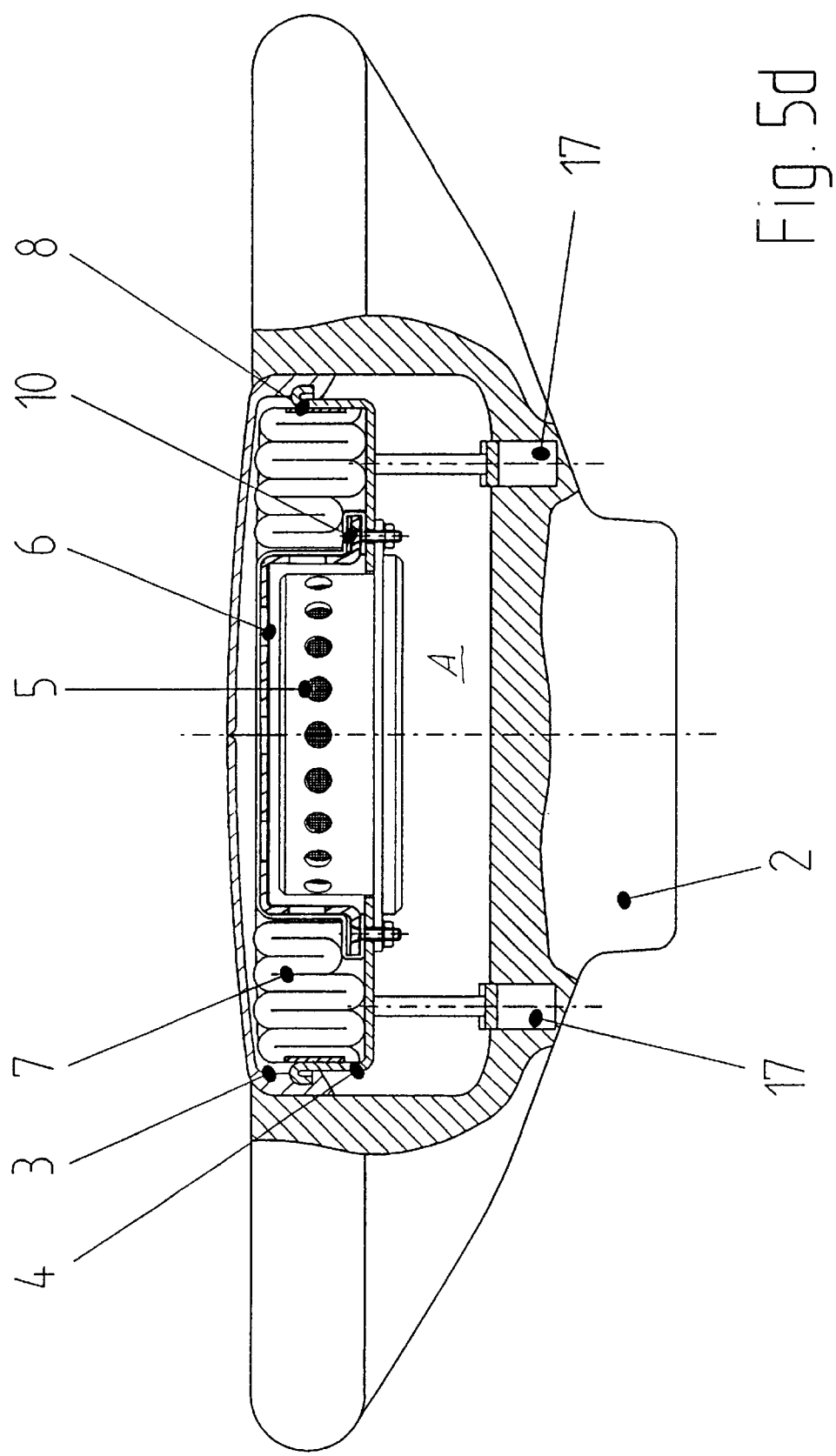

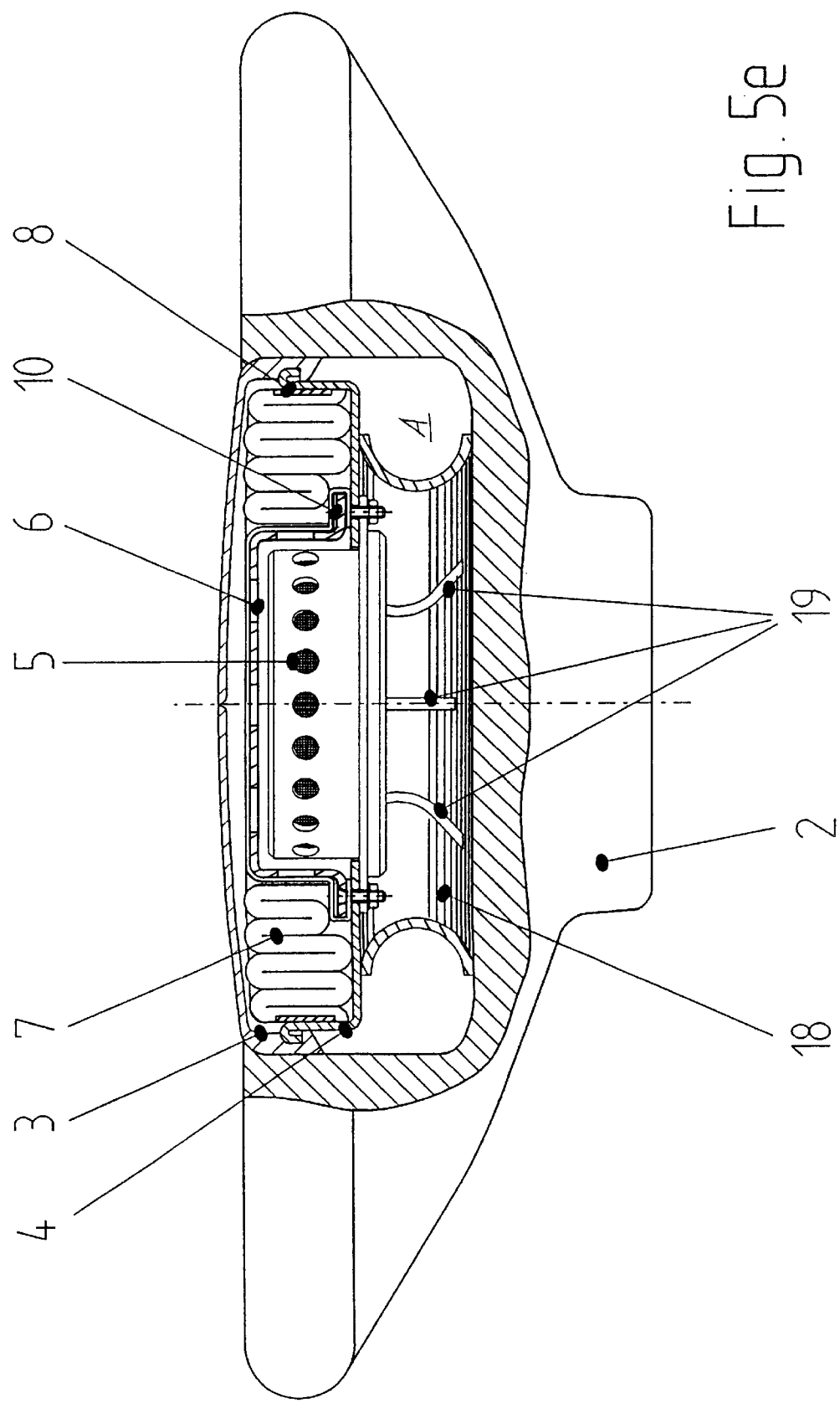

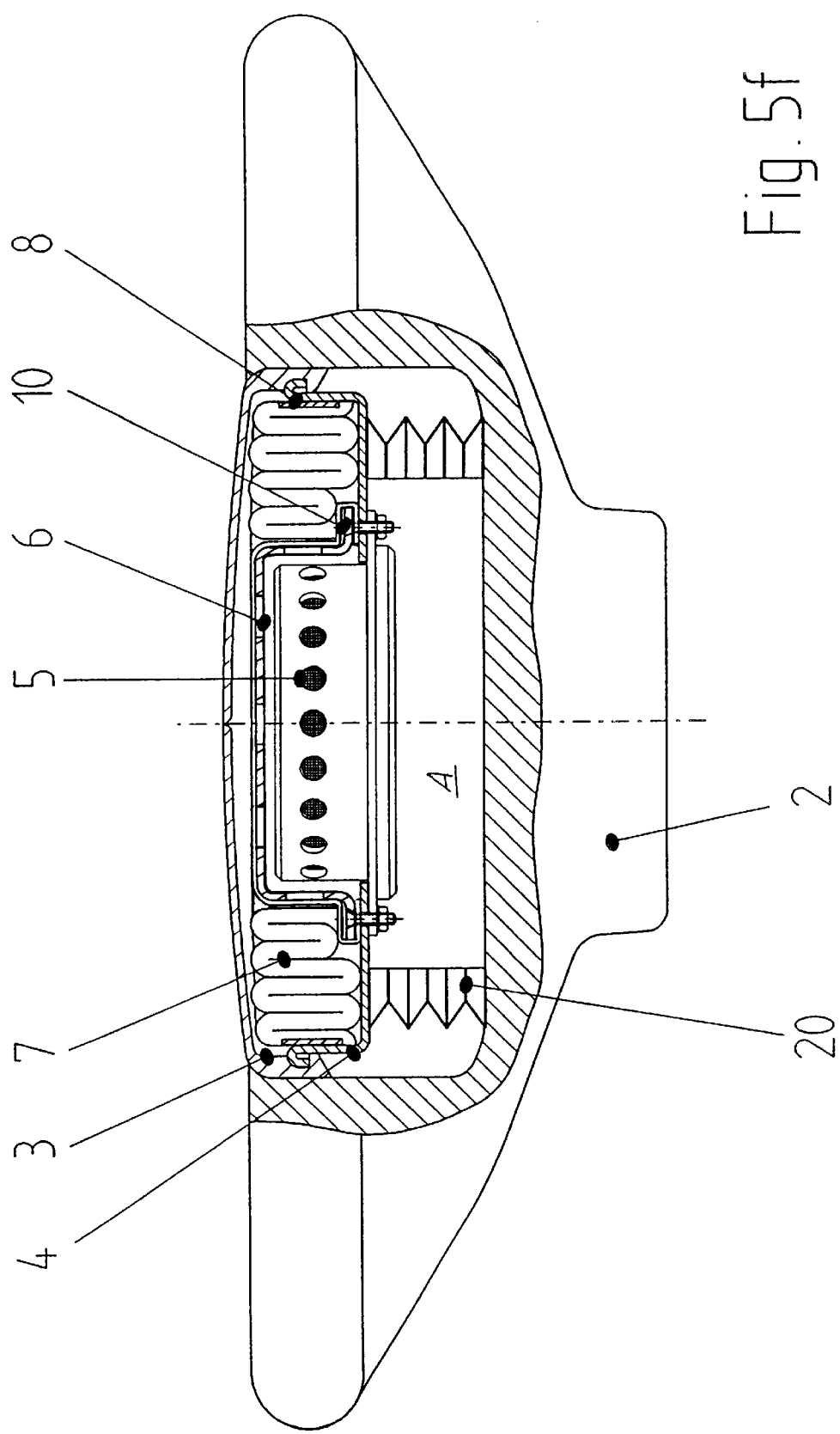

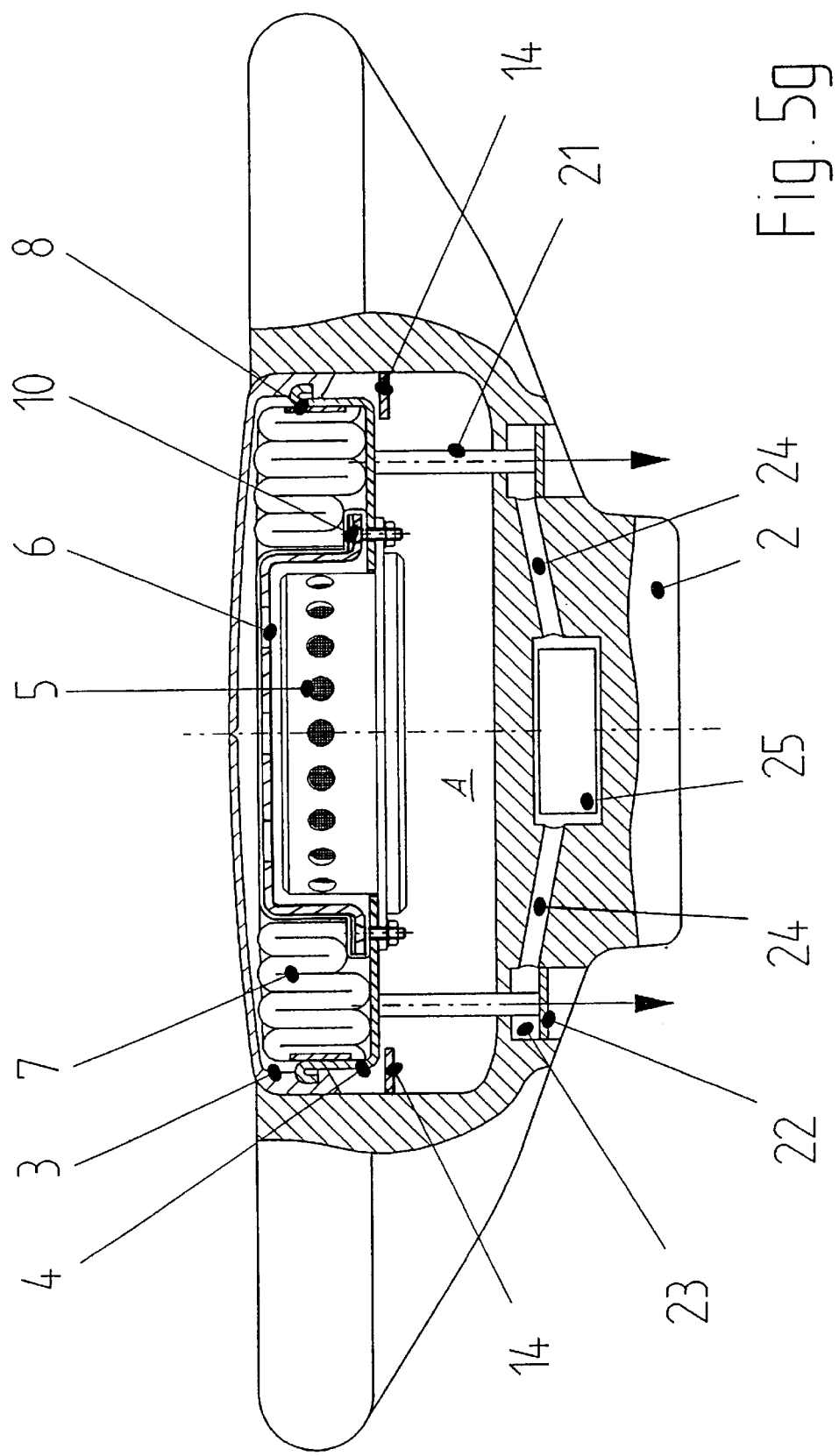

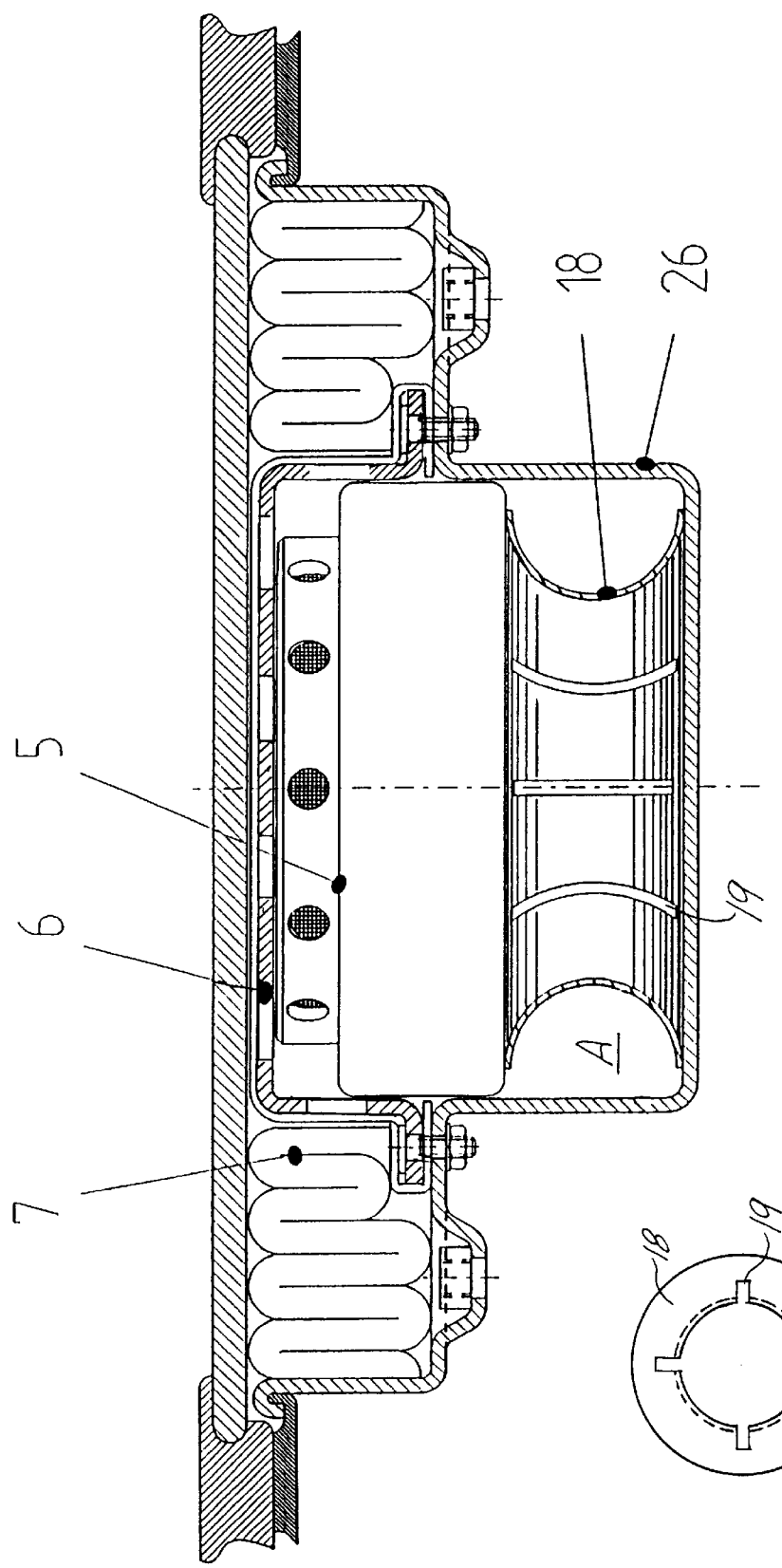

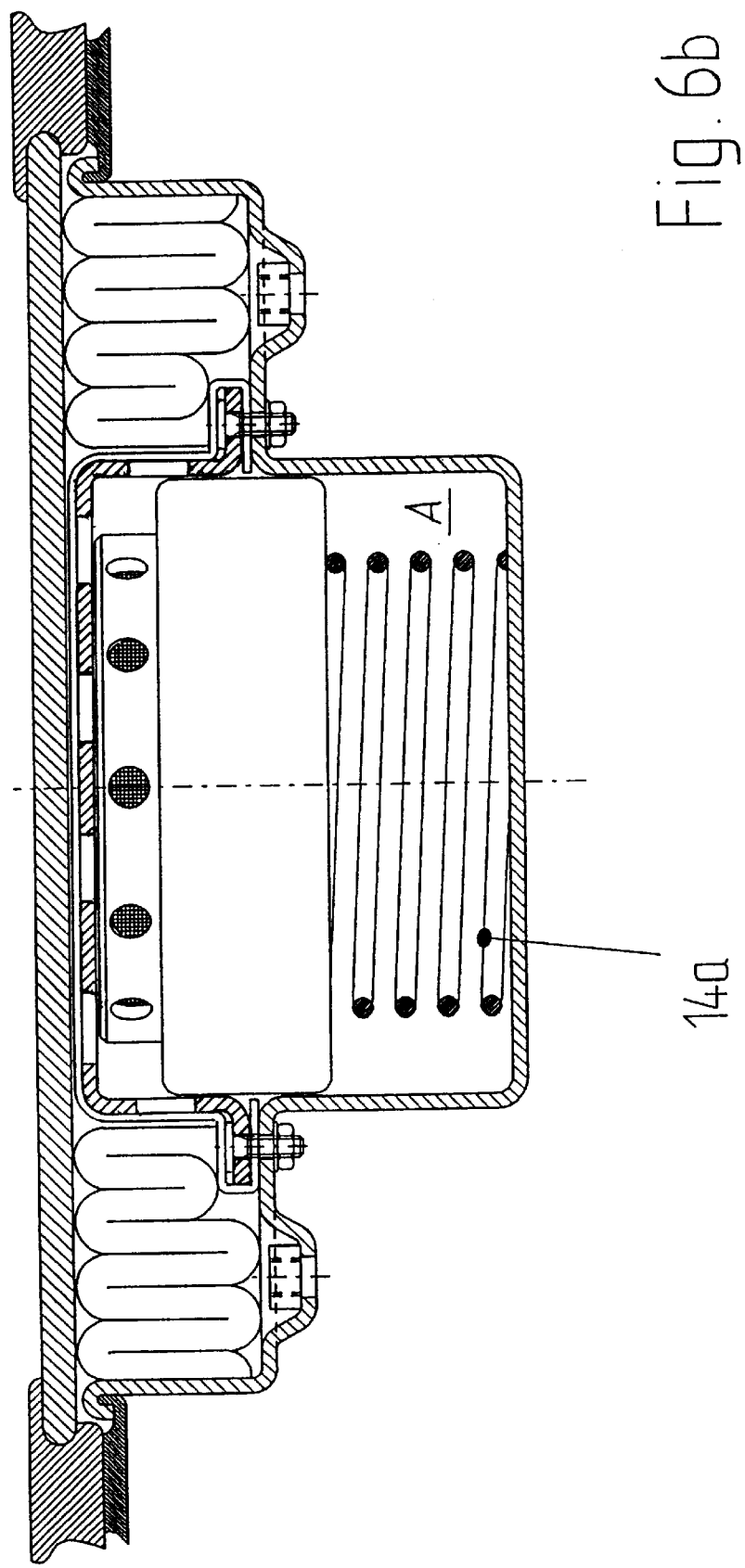

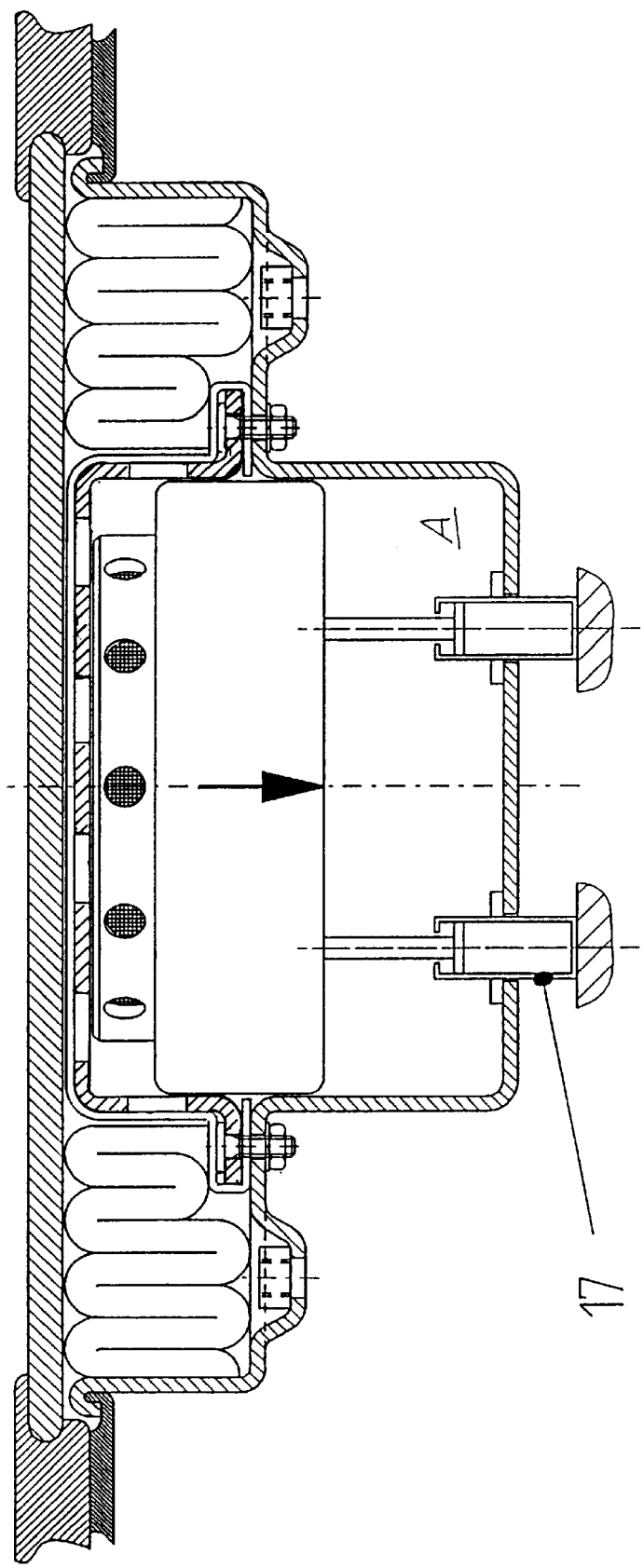

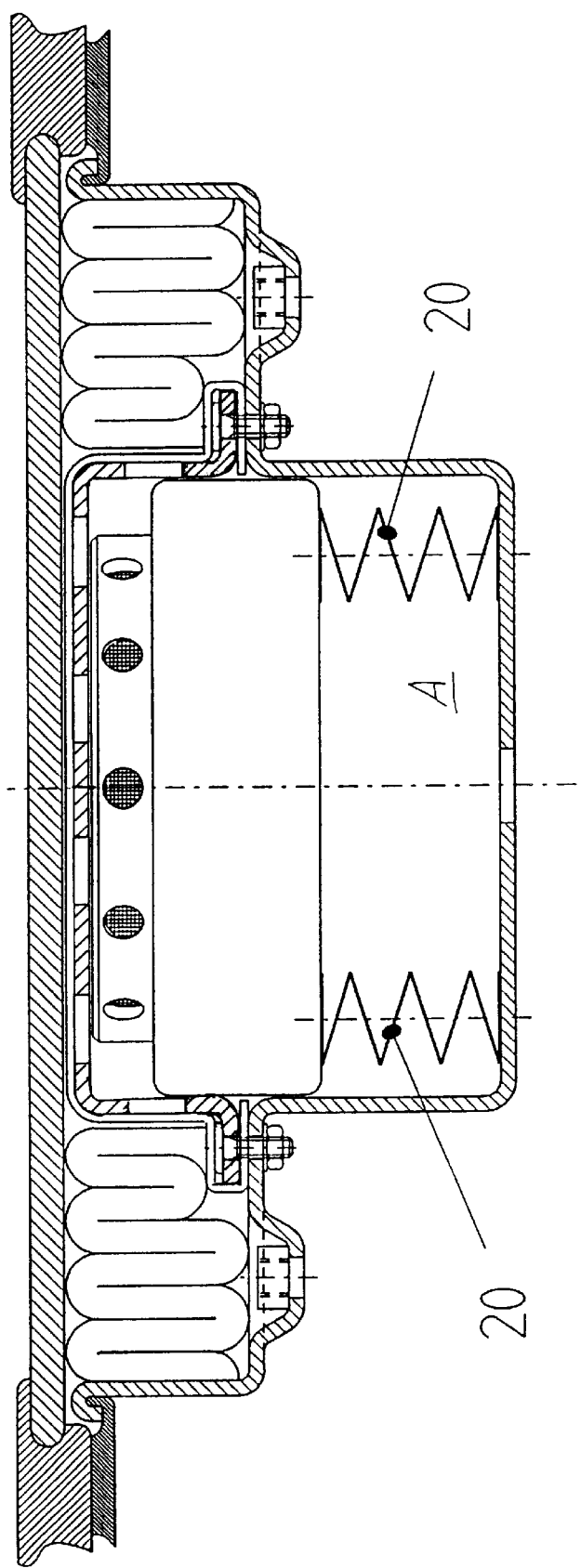

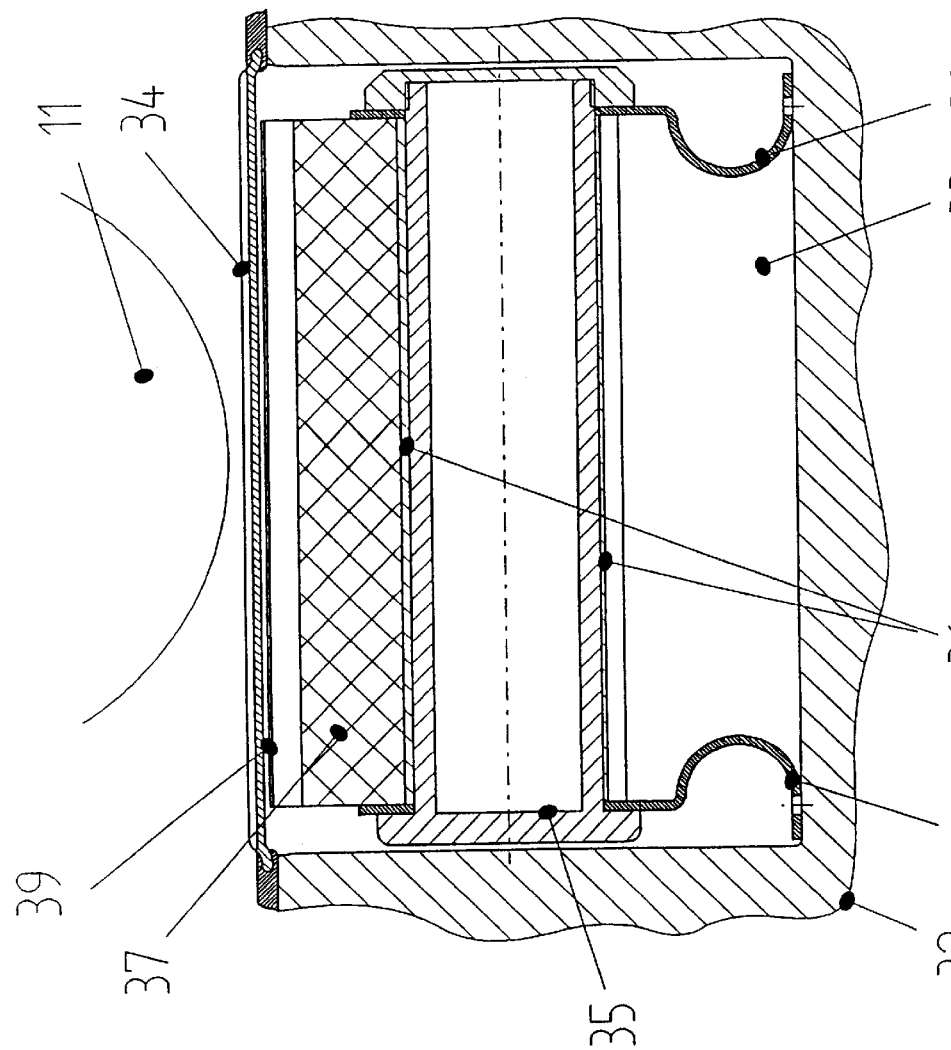

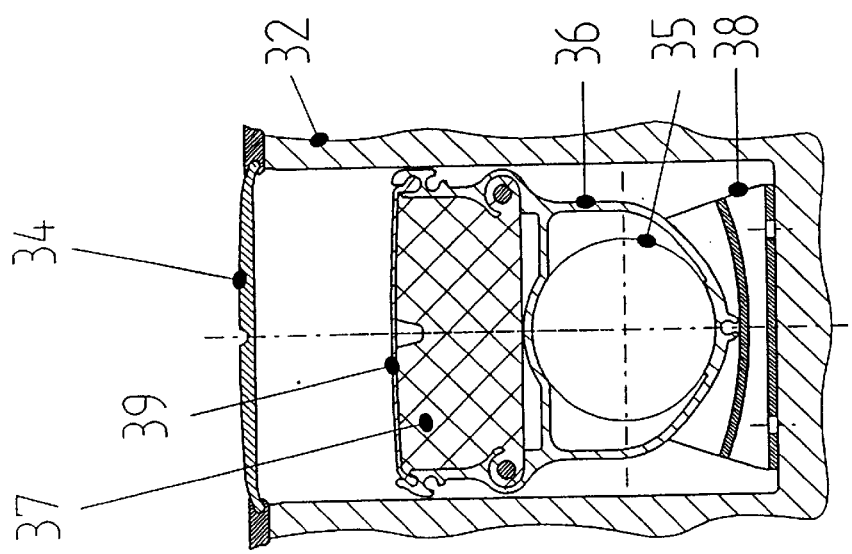
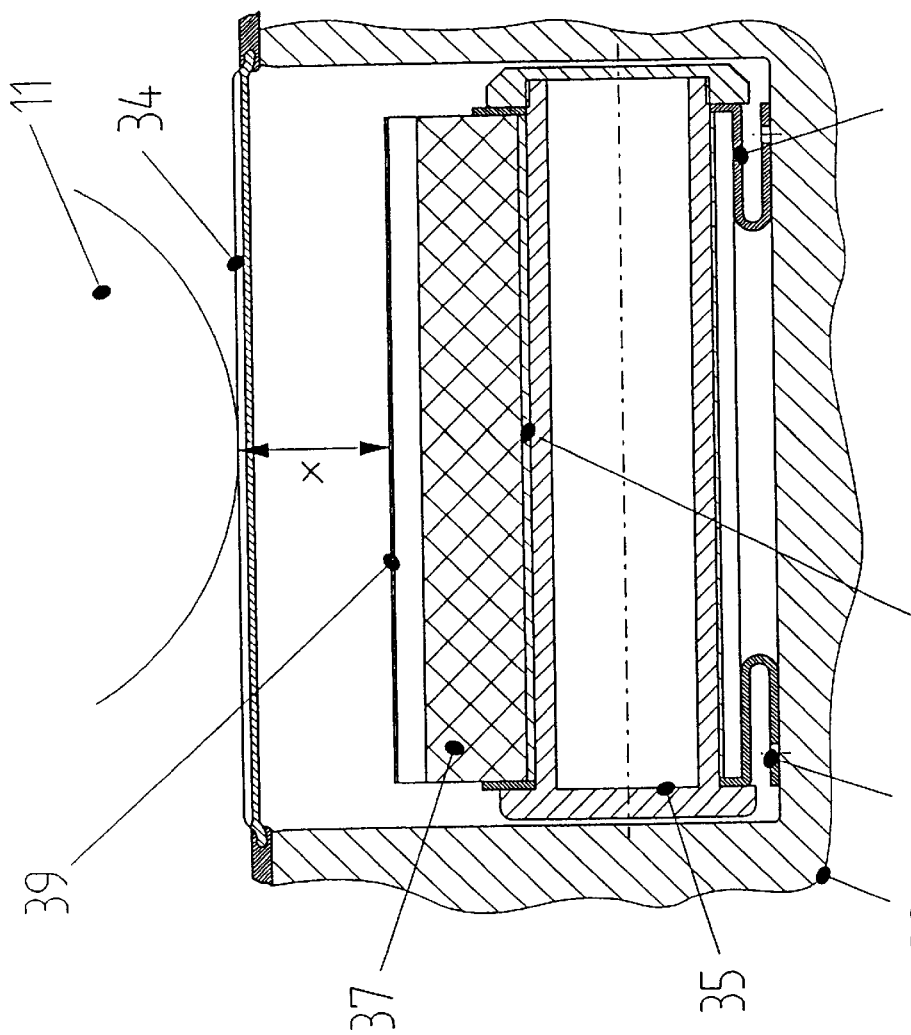

5,826,901

AIRBAG SYSTEM FOR VEHICLE

CROSS-REFERENCE TO RELATED APPLICATION

This is a CONTINUATION of application Ser. No. 08/516,845, filed Aug. 18, 1995, now abandoned.

BACKGROUND OF THE INVENTION

This invention relates to airbag systems.

It is becoming customary to utilize airbag systems, which in the event of an accident involving the vehicle, automatically inflate a cushion or airbag in front of a vehicle occupant located in either the driver's seat or the passenger's seat. The airbag is inflated with a gas generator.

For the airbag to be effective, it is necessary for it to inflate in a very short time. In practice, inflation is completed within a few milliseconds. Thus, in the event of impact on the vehicle, the cushion is already inflated before the vehicle occupant is flung in the direction of the cushion. For a safe inflation of the airbag, it is presumed that the occupant is located in a normal position seated erect in the vehicle seat, so that the occupant does not contact the airbag during its inflation.

However, the vehicle occupant is frequently out of the normal position during the impact on the vehicle. The impact can cause the occupant to bend forward so that the head of the occupant is located inside the space provided for the inflation of the airbag. Then the airbag and possibly parts of the covering cap strike the occupant thereby injuring the occupant during inflation. Thus, there is a risk of injury to the vehicle occupant caused by the rapidly inflating airbag.

To avoid injury to the vehicle occupant caused by inflation of the airbag, it is known from DE 42 27 559 A1 to inflate the airbag in the direction of the occupant (axial direction) with a comparatively slower expansion speed and in the directions not directly at the occupant (sideways directions) with a comparatively greater expansion speed. However, this device has the drawback that the airbag may still not be fully inflated in the direction toward the vehicle occupant if the occupant has bent forward during impact.

From DE 42 25 671 A1, a steering column for a vehicle is known which has a draw-back device mounted on the side of the steering column for retracting the steering wheel away from a vehicle occupant. The steering column has steering column sections which are axially displaceable relative to the other sections. The steering column sections are held in their normal position by a cable against spring force. In the event of a crash, an electrical impulse of the central release electronic system of the airbag activates a cutter blade which cuts through the cable. The spring is thereby relaxed and the steering column tube and thus the steering wheel with airbag are moved away from the driver. This device is functional but is disadvantageous in that it is very expensive and requires a considerable amount of room which is typically not available as a rule in the area surrounding the steering column.

Furthermore from DE 42 11 674 C1 a steering column is known which has a tiltable steering wheel for a vehicle equipped with an inflatable airbag. During ignition of the airbag generator, the inclined position of the steering wheel is automatically brought to a tilted position with a smaller angle relative to a horizontal line. That is, the head of the steering column is swivelled towards the body of the vehicle driver. In this position the airbag is interposed between the vehicle driver and the steering column. In the event of a crash, the displaceable steering wheel is brought into a position in which the airbag is operative and closer to the vehicle occupant. Thus, it does not overcome the disadvantage that an occupant bending forward in the event of a crash falls into the inflating airbag.

BRIEF SUMMARY OF THE INVENTION

There is, therefore, provided in an embodiment of the invention a novel airbag system for use in a vehicle. The airbag system has an airbag, gas generator for inflating the airbag, and means for translating at least part of the airbag system away from the vehicle occupant. By translating part of the airbag system away from the vehicle occupant, the risk of injury to the vehicle occupant from inflation of the airbag is reduced.

In another embodiment of the invention, the means for translating the airbag system utilizes the gas emerging from the gas generator to translate a part of the airbag system away from the vehicle occupant. The airbag system is held in the at rest position by deformable elements which deform to allow the translation of the airbag system and also dampen the movement of the airbag system.

Advantages of this invention will appear from the following description of the preferred embodiments and the accompanying drawings in which similar reference characters denote similar elements throughout the several views.

BRIEF DESCRIPTION OF THE DRAWINGS

FIG. 5b shows a view in partial cross-section of translatable airbag system for the driver's side of a motor vehicle having alternate means for retaining the airbag system in the at rest position and alternate means for controlling the translation;

FIG. 5d shows a view in partial cross-section of airbag system for the driver's side translatable of a motor vehicle having still another alternate means for retaining the airbag system in the at rest position and another alternate means for controlling the translation;

FIG. 5e shows a view in partial cross-section of a translatable airbag system for the driver's side of a motor vehicle having a further alternate means for retaining the airbag system in the at rest position and a further alternate means for controlling the translation;

FIG. 5f shows a view in partial cross-section of a translatable airbag system for the driver's side of a motor vehicle having a still further alternate means for retaining the airbag system in the at rest position and a still further alternate means for controlling the translation;

FIG. 5g shows a view in partial cross-section of a translatable airbag system for the driver's side of a motor vehicle having a different alternate means for retaining the airbag system in the at rest position and a different alternate means for controlling the translation;

FIG. 5h shows a top elevational view of a ring comprising a deformable element providing the means for controlling the translation of the airbag system;

FIG. 6a shows a view in partial cross-section of an airbag system for the driver's side of a motor vehicle with a translatable gas generator and having a means for retaining the gas generator in the at rest position and means for controlling the translation of the gas generator;

FIG. 6b shows a view in partial cross-section of an airbag system for the driver's side of a motor vehicle translatable gas generator and having another alternate means for retaining the gas generator in the at rest position and another alternate means for controlling the translation of the gas generator;

FIG. 6c shows a view in partial cross-section of an airbag system for the driver's side of a motor vehicle translatable gas generator and having still another alternate means for retaining the gas generator in the at rest position and still another alternate means for controlling the translation of the gas generator;

FIG. 6d shows a view in partial cross-section of an airbag system for the driver's side of a motor vehicle translatable gas generator and having a further alternate means for retaining the gas generator in the at rest position and a further alternate means for controlling the translation of the gas generator;

FIG. 7a is a longitudinal cross-sectional view of a translatable airbag system for the passenger's side of a motor vehicle shown in the rest position;

FIG. 7b is an end cross-sectional view of the airbag system of FIG. 7a;

FIG. 8a is a longitudinal cross-sectional view of the airbag system of FIG. 7a after ignition of the gas generator;

FIG. 8b is an end cross-sectional view of the airbag system of FIG. 7a after ignition of the gas generator;

DETAILED DESCRIPTION

Figure 1:
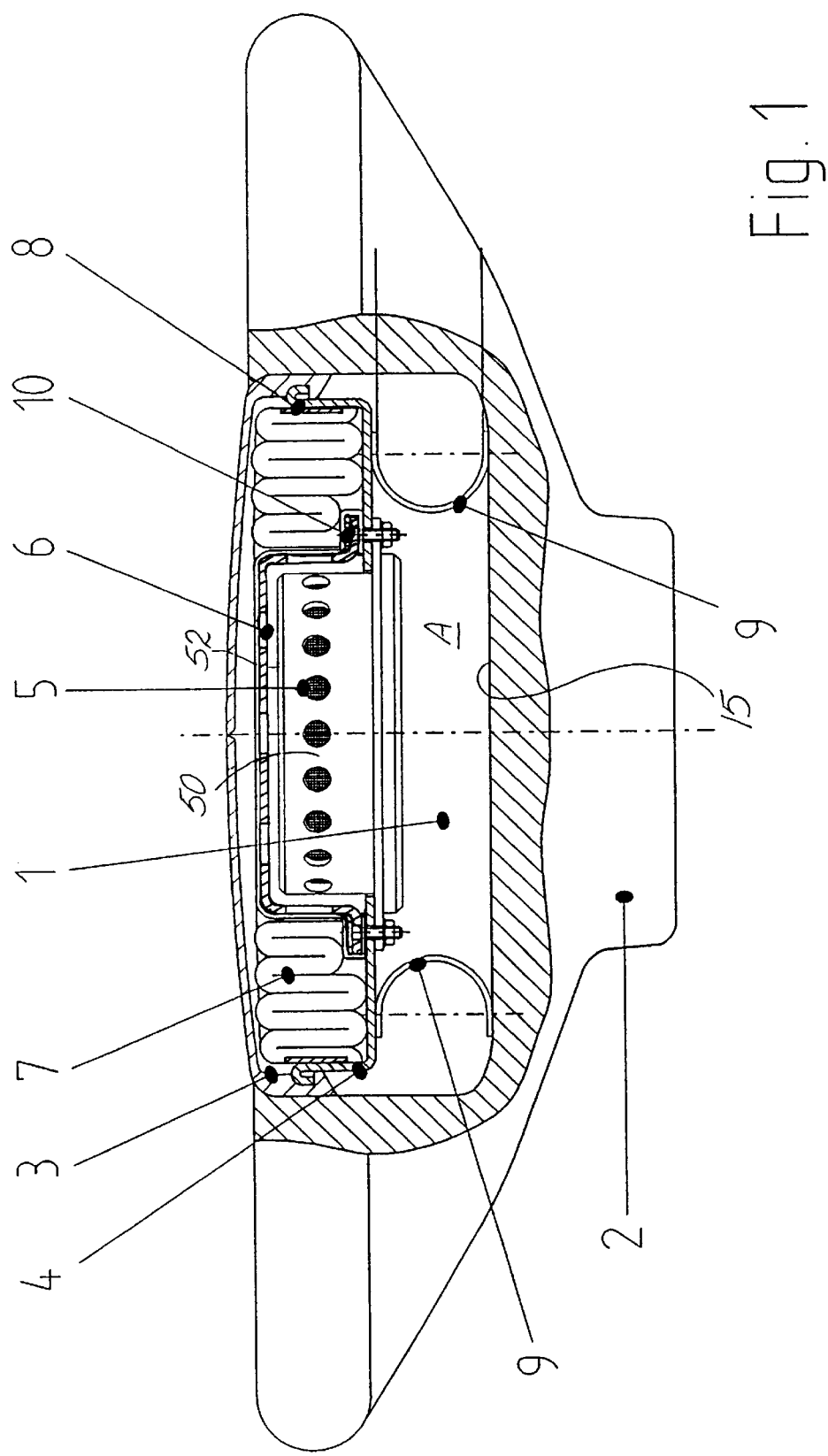
FIG. 1 shows a view in partial cross-section of an airbag system in the rest position with the ability to move axially for a driver's side of a motor vehicle.

Turning to the drawings, an airbag system for motor vehicles is shown in FIG. 1 having an airbag 7, and at least one gas generator 5 for inflating the airbag in the event of impact on the motor vehicle. The airbag system is fixed on the vehicle where it can move away, at least in part from the vehicle occupant. This is achieved by attaching the airbag system or parts thereof to the vehicle so that they can be displaced, rotated, or tilted. The airbag system is moved prior to or simultaneous with inflation of the airbag. The gases emerging from the gas generator after ignition of the gas generator or a separate apparatus, comprising an alternate means for translating at least a portion of the airbag system away from the occupant, is used to translate the airbag system. Therefore, without affecting the inflation process of the airbag, the risk of injury to a vehicle occupant from the inflating airbag who has bent forward from a normal sitting position is avoided or at least reduced.

The airbag system is set in a hub dish 1 of a steering wheel, generally designated 2, of a motor vehicle. The airbag system has a gas generator 5, an airbag 7 with a tension band 8, and an impact cap 3 covering the airbag system. The airbag 7 is attached to a fastening cap 6 which partially encloses the gas generator 5. Specifically, the cap 6 encloses the side 50 and the face 52 which faces towards a vehicle occupant. The gas generator 5 and the fastening cap 6 are fixed on a support plate or module 4 with screws 10. Furthermore, at least one but preferably two or three bending plates 9 are fixably mounted on one side on the base of the hub dish 1 and on the other side on the module 4.

Figure 2:
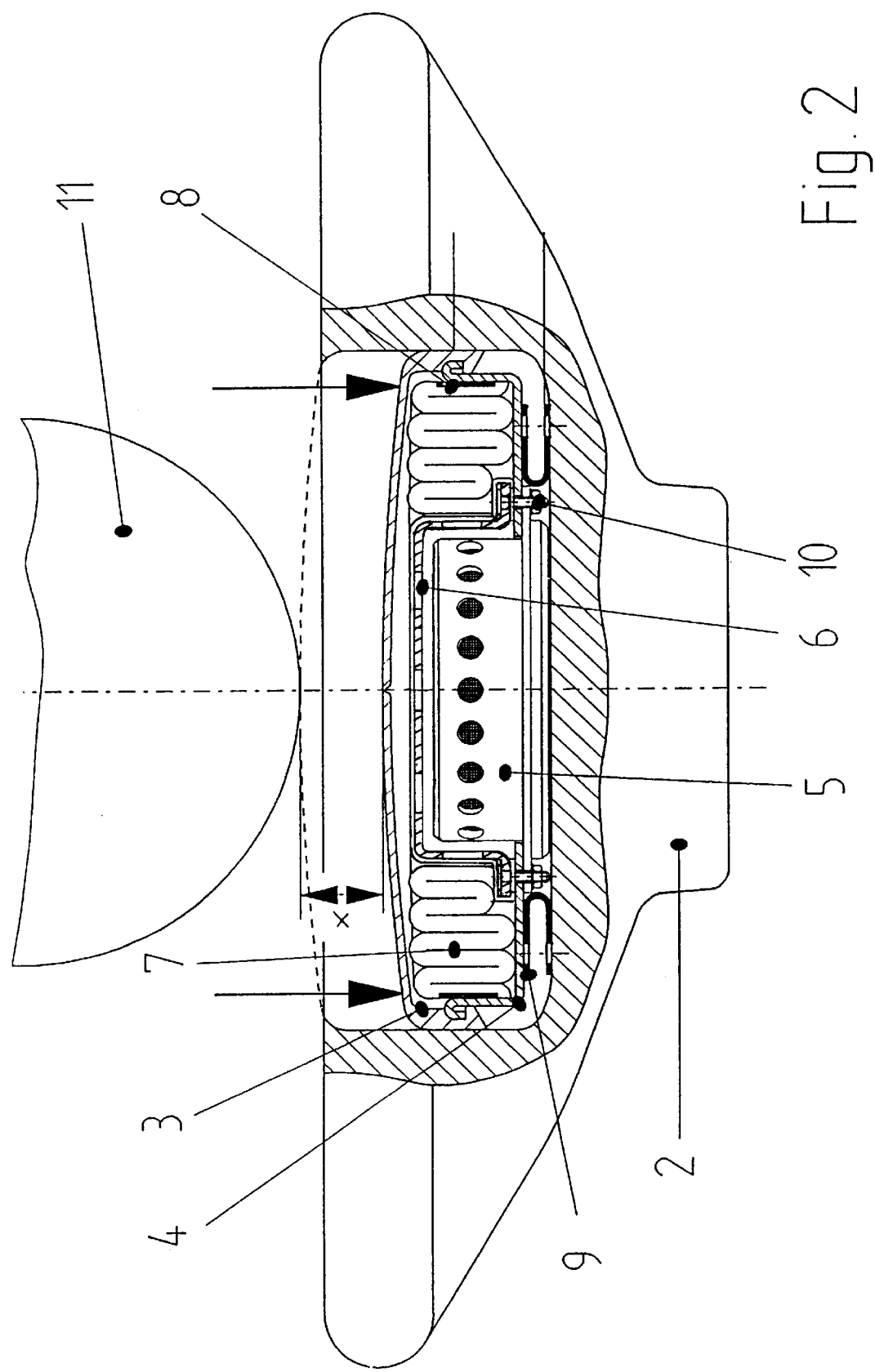
FIG. 2 shows the airbag system of FIG. 1 after ignition of the gas generator and the generator has moved away from the vehicle occupant but before the airbag is inflated.

FIG. 1 shows the airbag system in its rest position. FIG. 2 shows its position after ignition of the gas generator 5. Ignition of the gas generator 5 creates forces which bend the bending plates 9 until they are compressed into a two layer flat sheet so that the module 4 is displaced together with the gas generator 5 and airbag 7 into a hollow space A (FIG. 1) of the steering wheel and thus away from the occupant.

The bending plates 9, interposed between the module 4 and the base 15 of the hollow space A, provide plastically deformable elements which not only allow the airbag system to translate into the hollow space upon ignition of gas generator, but also hold the airbag system in its at rest position before ignition of the gas generator. Additionally, the bending plates dampen or smooth the translation of the airbag system into the hollow space A. Therefore the deformable element provides both a means for retaining the airbag system in the at rest position and a means for dampening the translation of the airbag system. The dampening by the deformable elements absorbs energy during inflation of the airbag and moderates the opening of the impact cap. By plastically deforming, the deformable element prevents the airbag system from recoiling back into the vehicle occupant. The dampening elements provide a concomitant safety benefit in that upon an impact on the vehicle of a magnitude not great enough to initiate the inflation of the airbag but in which the head of the vehicle occupant contacts the steering wheel, the dampening elements deform thereby cushioning the impact of the vehicle occupants head on the steering wheel.

The steering wheel has holes (not shown) which vent the hollow space to atmosphere so that the air inside the hollow space can escape from between the steering wheel 2 and module 4 and no air pressure high enough to prevent translation of the airbag system into the hollow space can build up preventing compression of the bending plates 9.

In rarely occurring extreme cases, in which the distance of the occupant's head 11 from the impact cap 3 when the airbag system is in the rest position is zero, a gap is created between the head 11 and the impact cap 3 by sliding the module 4 into the hollow space. The danger of injury is thus reduced even for this extreme case. In more likely situations where the driver bends forward less than in the illustrated case, the risk of injury is further reduced or completely avoided by translation of the inflating airbag away from the occupant.

Figure 3:
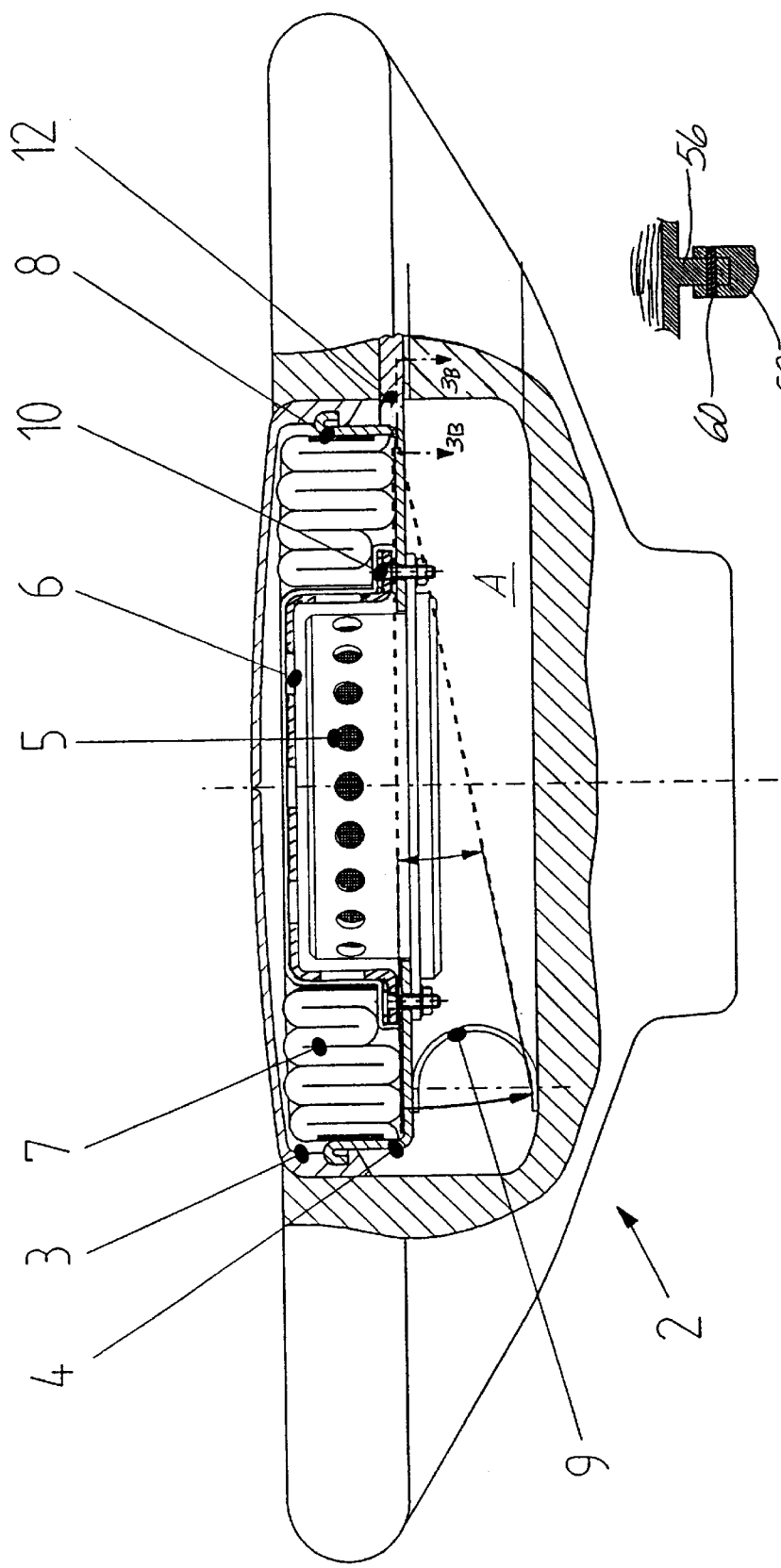
FIG. 3A shows a view in partial cross-section of an airbag system in the rest position with the ability to move on one side for the driver's side of a motor vehicle.
FIG. 3B shows a fragmentary cross-sectional view taken along line 3B—3B of FIG. 3A of the pivot joint utilized in FIG. 3A.

In the embodiment of FIGS. 3a and 3b, the module 4 is pivotally fixed on one side to the steering wheel 2 with a pivoting joint 12. The pivoting joint 12 comprises flange 56 extending from the steering wheel 2 which is connected to a flange 58 extending from the module by a pivot pin 60 inserted through aligned apertures in the flanges 56 and 58. A plastically deformable bending plate 9 is provided on the opposite side of the module, as shown in the previous embodiment.

Figure 4:
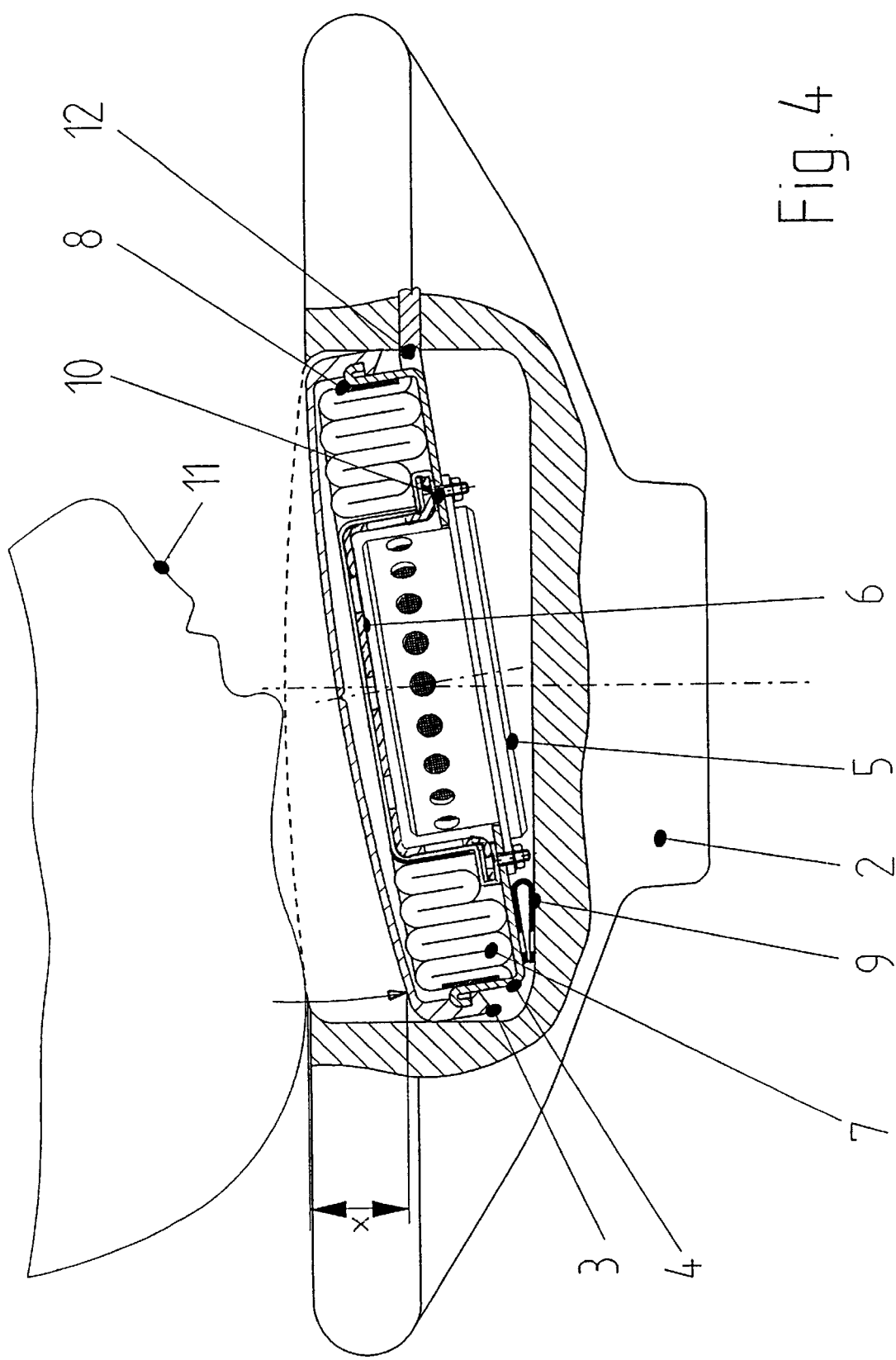
FIG. 4 shows the airbag system of FIG. 3A after ignition of the gas generator.

Referring to FIG. 4, in this embodiment, the airbag system in the upper portion of the steering wheel is translated into the steering wheel and pivots at the lower portion of the steering wheel. The lower portion essentially retains its original position, but the upper portion is translated further away from the vehicle occupant thereby reducing the risk of injury to the occupant.

FIGS. 5a through 5g show alternate embodiments of the displaceably means for holding the airbag system in place while the airbag system is at rest.

Figure 5A:
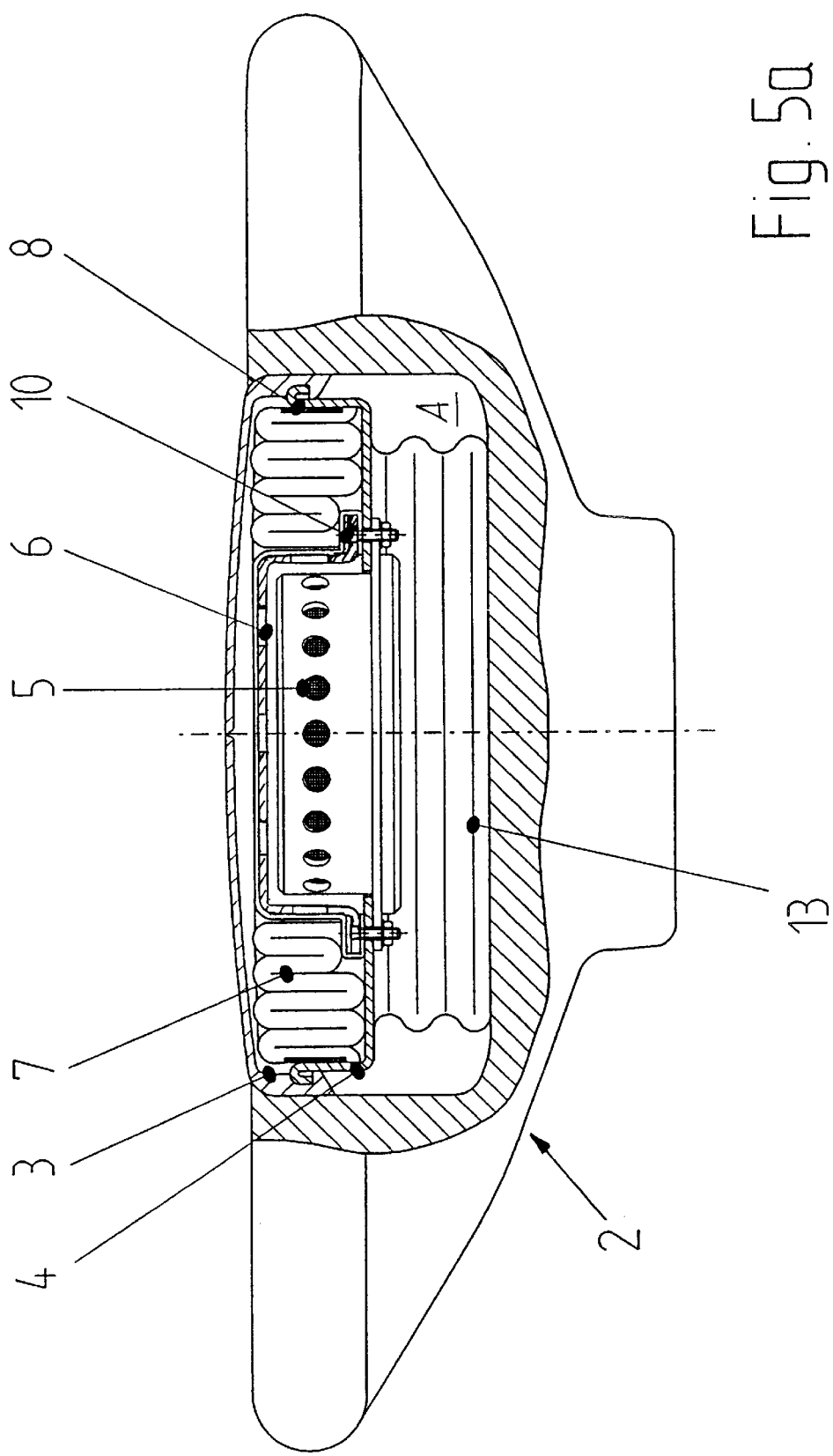
FIG. 5a shows a view in partial cross-section of a translatable airbag system for the driver's side of a motor vehicle having means for retaining the airbag system in the at rest position and means for controlling the translation.

In FIG. 5a a corrugated tube 13 is provided as the statically deforming element and allows translation of the airbag system in a straight line into the hollow space A inside of the steering wheel.

In FIG. 5b an elastically deformable element comprising a coil spring 14a is provided as the deforming element and likewise allows translation of the airbag system in a straight line into the hollow space A inside of the steering wheel.

Figure 5C:
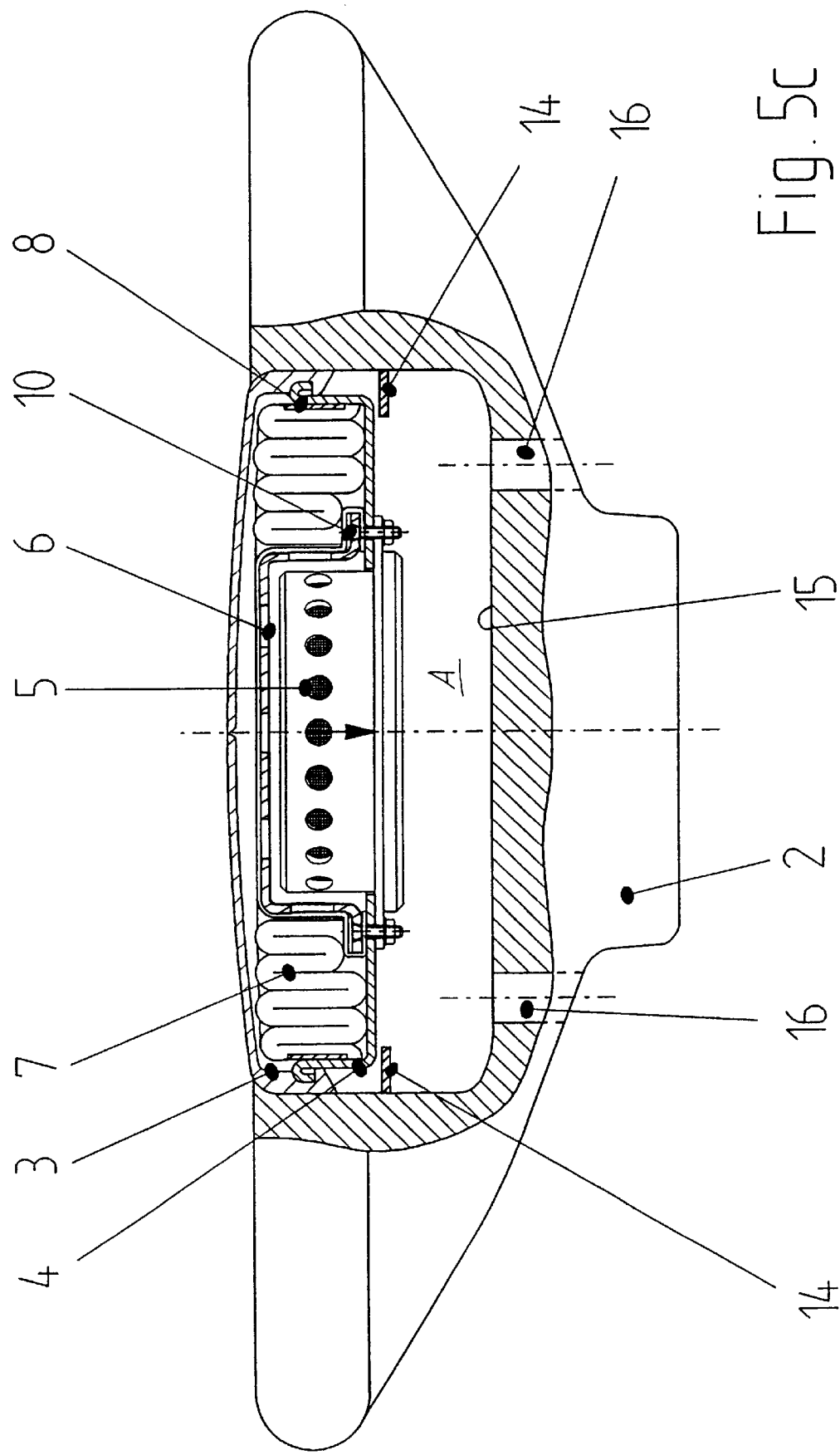
FIG. 5c shows a view in partial cross-section of a translatable airbag system for the driver's side of a motor vehicle having another alternate means for retaining the airbag system in the at rest position and another alternate means for controlling the translation.

FIG. 5c shows an embodiment where the module 4 rests on retaining elements comprising shear-off pins 14. When the retaining elements are used as the means for retaining the airbag system in the at rest position, it is desirable to provide an independent means for dampening. Underneath the module is a hollow space A which when the module 4 is in the rest position the hollow space contains air at atmospheric pressure. After ignition of the gas generator 5 and as a result of the forces created by the gas generator on the airbag system, the module 4 shears off the shear-off pins 14. The airbag system thereby moves further into the inside of the steering wheel. The air in the hollow space is thereby compressed whereby the movement of the module 4 is dampened. Thus, the hollow space forms an air compression damper. The air can escape in limited amounts through outlet openings 16 so that it is ensured that the module 4 is translated all the way up to the base 15 of the hollow space. Separate outlet openings are not required provided the hollow space already has openings required for the airbag system through which the air can escape.

In the alternate embodiment shown in FIG. 5d the module 4 is mounted on shock absorbers 17 or gas compression dampers. The forces created by the gas generator push the module into the hollow space thereby compressing the gas in the shock absorbers. The shock absorbers ensure both the securement of the module 4 in the rest position because the gas inside the shock absorber must be compressed to move the module from the at rest position and the damped movement of the module into the hollow space by compressing the gas inside the shock absorbers which requires an increasing force as the gas is further compressed after ignition of the gas generator 5.

In the embodiment of FIG. 5e a deforming element is provided in the form of a ring 18 having an annular side wall which is U-shaped in cross-section and which has relaxation slits 19 to improve the deformation. FIG. 5a shows a top view of the ring with dashed lines indicating the thickness of the annular side wall. Specifically, as shown in FIG. 5h, the relaxation slits 19 are openings in the U-shaped ring 18 which because of the material removed to make the slits allow the ring to deform with less force.

In the embodiment of FIG. 5f prefolded bending plates 20 are provided as the deforming elements. When the gas generator 5 is ignited, the forces created by the discharging gas compress the bending plates 20 at the prefolds. Thus, the module moves into the hollow space A and the movement is dampened by the prefolded bending plates 20.

In the alternate embodiment of FIG. 5g, the module 4 is mounted on piston rods 21 of several pistons 22. The pistons are provided in separate cylinder chambers 23 which are connected by channels 24 to a separate instant expansion propulsion unit 25 which is activated with an ignition capsule (not shown). In the rest position, the module 4 rests on shear-off pins 14. The propulsion unit 25 is ignited before or simultaneous with the gas generator 5. Thus, it is possible to control when the airbag system translates away from the vehicle occupant independently from the ignition of the gas generator. The gases from the propulsion unit press on the pistons and pull the module toward the hollow space A. The module 4 contacts and shears off the shear-off pins, and then the module is translated with the airbag system into the hollow space A.

When the gas emerging from the gas generator is utilized to translate the airbag system, the force created from thrusting gas particles toward the vehicle occupant push the airbag system into the hollow space. Thus, the gas generator moves the airbag system in the same manner as a rocket is propelled. The force created by the gas generator is great enough to deform the deformable elements, compress the spring elements, and sheer off the sheer-off pins.

FIGS. 6a to 6d show alternate embodiments where the gas generator 5 is movable independent of the module 4 and the airbag 7, so that only the gas generator is translated away from the vehicle occupant upon ignition of the gas generator 5. The airbag 7 remains in its original position. In these embodiments, the gas generator is mounted beneath the fastening cap 6 and in a container 26 connected therewith. As in the previous embodiments, the gas generator can translate into the hollow space A. It is retained in the at rest position in a similar way to the module 4 in the embodiments of FIGS. 5a to 5f: on a ring 18 (FIG. 6a), coil spring 14a (FIG. 6b), shock absorbers 17 (FIG. 6c), or prefolded bending plates 20 (FIG. 6d).

FIGS. 7a and 7b show an airbag system for a passenger seat. The airbag system has a tube gas generator 35, an airbag 37, and an impact cap 34 covering the system. The airbag 37 is fixed in a housing 36 in which the gas generator 35 is also mounted. Furthermore, two bending plates 38 are provided which are fixed on one side to the base of a chamber 33 of the vehicle coachwork 32 and on the other side to the housing 36. The folded airbag is covered by a covering cap 39.

The method of operation for the passenger side airbag is the same as for the embodiment of FIGS. 1 and 2 for the driver side airbag. The forces created by the gas discharged from the gas generator 35 force the airbag system into the chamber 33 to the position shown in FIGS. 8a and 8b. The airbag system is moved away from the occupant after ignition of the gas generator through deformation of the bending plates 38 in the chamber 33. Thus, at least the distance X exists between the head 11 of the occupant and the covering cap 39.

Figures 9A, 9B:
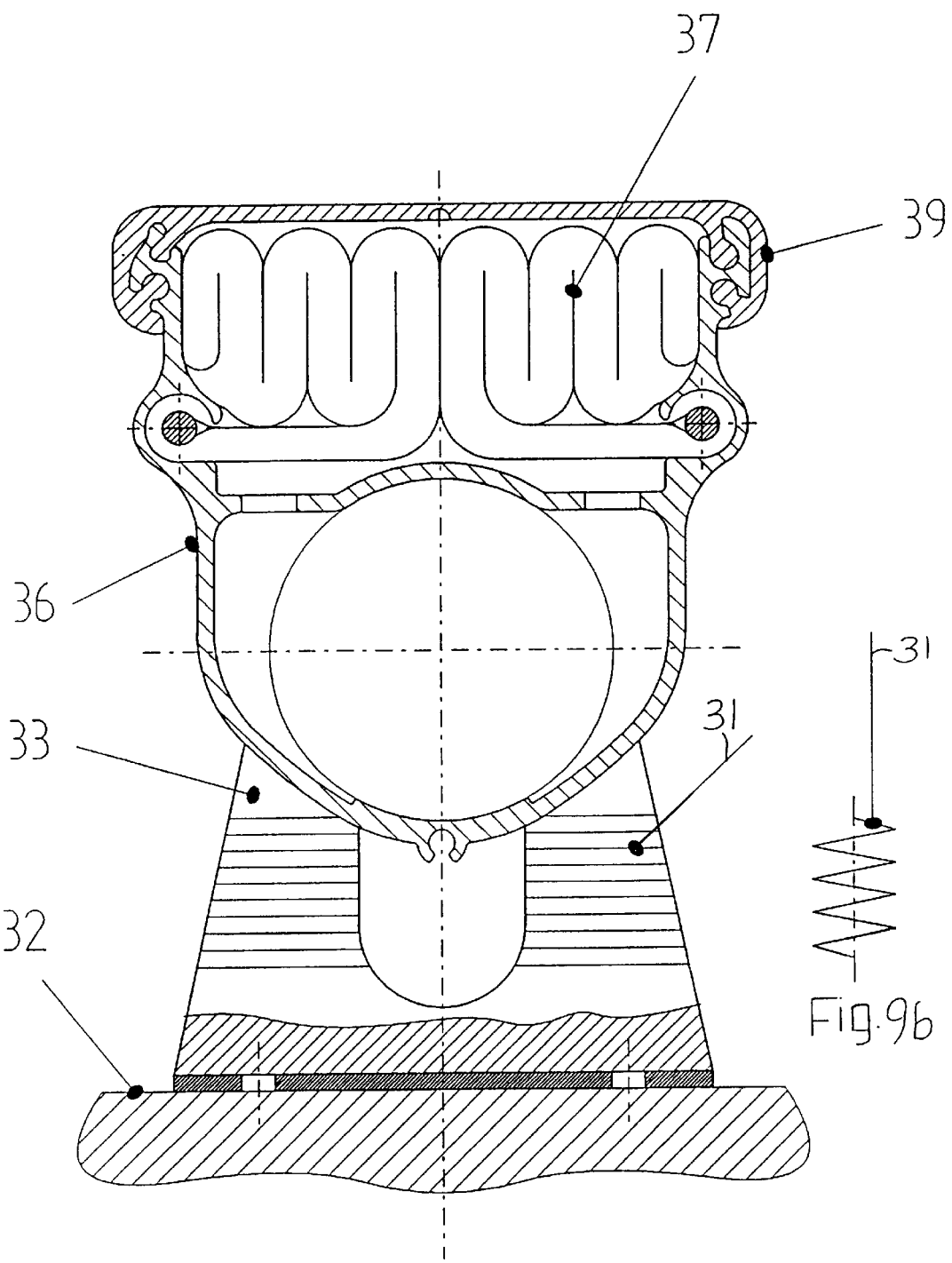
FIG. 9a is a cross-sectional view of a translatable airbag system for the passenger side having a prefolded bending plate.
FIG. 9b is an elevational view of the prefolded bending plate.

FIG. 9a shows an airbag system for a passenger seat where the housing 36 is attached on prefolded bending plates 31 shown in FIG. 9b. Again, the force created by the discharge of gas from the gas generator 35 thrusts the airbag system against the deformable element, in this embodiment the bending plates 31, deforming those elements thereby moving the airbag system into the chamber and away from the occupant.

Figure 10:
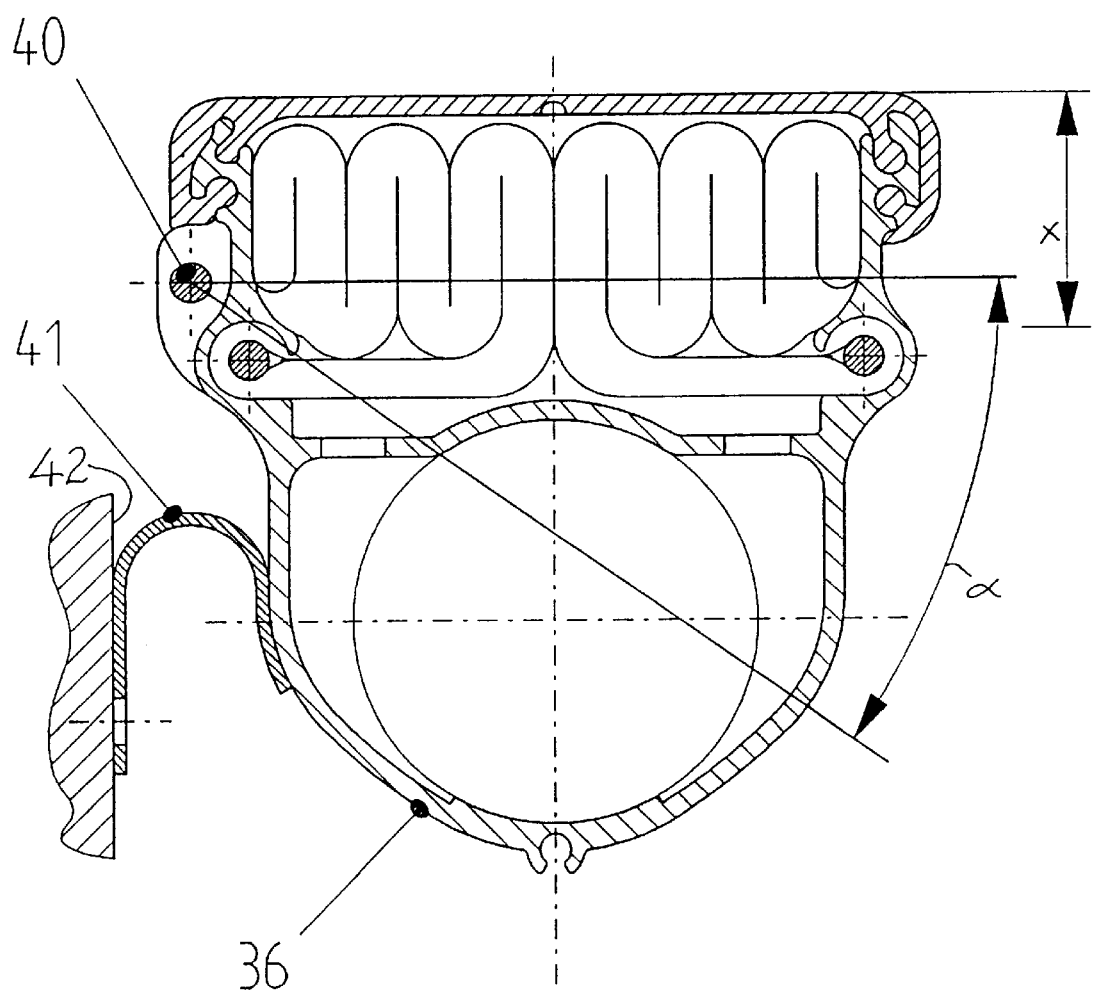
FIG. 10 is a cross-sectional view of a translatable airbag system for the passenger side of a motor vehicle which translates by rotation about a point.

FIG. 10 shows an embodiment of an airbag system for a passenger seat wherein the housing 36 is attached on one side by means of pivoting joint 40. Bending plates 41 are interposed between the housing 36 and the side wall 42 of the chamber defined by the vehicle coachwork. When the gas generator is ignited, the force from the gas discharge rotates the airbag system about the pivot joint 40 deforming the bending plates 41 until the airbag system as rotated through the illustrated angled α. The side of the airbag system opposite the pivot joint is moved away from the occupant by the distance X.

Thus, an airbag system is disclosed which utilizes deformable members attached to a module or gas generator to translate the airbag away from the vehicle occupant during airbag inflation thereby reducing the risk of injury to the occupant from the inflating airbag. While embodiments and applications of this invention have been shown and described, it would be apparent to those skilled in the art that many more modifications are possible without departing from the inventive concepts herein. It is, therefore, to be understood that within the scope of the appended claims, this invention may be practiced otherwise than as specifically described.

The disclosure of attached German patent application P44 30 588.5-21, filed Aug. 19, 1994 is incorporated fully herein by reference. Priority of this German application is claimed.

What is claimed:

1. An airbag system for use in a vehicle which protects an occupant of the vehicle in the event of an impact on the vehicle, the airbag system comprising:

an airbag module comprising an airbag and a gas generator for inflating the airbag; and at least one plastically deformable members, which is U-shaped in cross-section, connected with the airbag module for restraining movement of the airbag module away from the vehicle occupant in the absence of either an impact force acting on the airbag system or ignition of the gas generator, wherein said at least one plastically deformable member is responsive to ignition of the gas generator for enabling at least a portion of the airbag module to translate away from the vehicle occupant, whereby the inflation of the airbag does not injure the vehicle occupant, and further preventing airbag recoil after such translation.

2. The airbag system of claim 1 wherein the airbag module comprises a first end portion and a second end portion and wherein the at least one plastically deformable U-shaped member is attached to the first end portion and a hinge is attached to the second end portion to allow the airbag module to pivot.

3. The airbag system of claim 1 wherein the plastically deformable member comprises a ring.

4. The airbag system of claim 3 wherein the ring comprises slits whereby the ring is more easily deformed.

5. An airbag system for use in a vehicle which protects an occupant of the vehicle in the event of an impact on the vehicle, the airbag system comprising:

an airbag;

a gas generator for inflating the airbag; and at least one plastically deformable member, which is U-shaped in cross-section, connected with the airbag system and responsive to ignition of the gas generator for enabling at least a portion of the airbag system to translate away from the vehicle occupant, whereby the inflation of the airbag does not injure the vehicle occupant, and further preventing airbag recoil after such translation, wherein the plastically deformable member comprises a ring.

6. The airbag system of claim 5 wherein the ring comprises slits whereby the ring is more easily deformed.

7. An airbag system for use in a vehicle which protects an occupant of the vehicle in the event of an impact on the vehicle, the airbag system comprising:

an airbag assembly comprising an airbag and a gas generator for inflating the airbag; and at least one plastically deformable member, which is U-shaped in cross-section, connected to the airbag assembly for restraining movement of the airbag assembly away from the vehicle occupant in the absence of either an impact force acting on the airbag system or ignition of the gas generator, wherein said at least one plastically deformable member is responsive to ignition of the gas generator for enabling the airbag assembly to translate away from the vehicle occupant and preventing airbag recoil after such translation.

8. The airbag system of claim 7 wherein the U-shaped member in cross-section comprises first and second legs, wherein, the first leg is supported in the airbag system and the second leg is connected to the airbag assembly.

9. The airbag system of claim 8 further comprising a cavity which houses the airbag assembly and the at least one plastically deformable member, wherein the first leg of the at least one plastically deformable member is supported in the cavity.

10. The airbag system of claim 7 wherein the concave portion of the at least one plastically deformable member faces away from a center of the airbag assembly.

* * * * *